(12) United States Patent
Liu (10) Patent No.: US 12,231,891 B2
(45) Date of Patent: Feb. 18, 2025

(54) REMOTE USER DEVICE DEAUTHENTICATION

(71) Applicant: T-Mobile Innovations LLC, Overland Park, KS (US)

(72) Inventor: ChengChang Liu, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 501 days.

(21) Appl. No.: 17/574,337

(22) Filed: Jan. 12, 2022

(65) Prior Publication Data

US 2023/0224708 A1 Jul. 13, 2023

(51) Int. Cl.
*H04W 12/082* (2021.01)
*H04W 12/06* (2021.01)
*H04W 12/61* (2021.01)
*H04W 12/63* (2021.01)
*H04W 12/71* (2021.01)

(52) U.S. Cl.
CPC ......... *H04W 12/082* (2021.01); *H04W 12/06* (2013.01); *H04W 12/61* (2021.01); *H04W 12/63* (2021.01); *H04W 12/71* (2021.01)

(58) Field of Classification Search
CPC ... H04W 12/082; H04W 12/06; H04W 12/61; H04W 12/63; H04W 12/71
See application file for complete search history.

(56) References Cited

U.S. PATENT DOCUMENTS

| | | | |
|---|---|---|---|
| 8,214,890 B2 | 6/2012 | Kirovski et al. | |
| 10,846,390 B2 | 11/2020 | Subramanian et al. | |
| 10,853,813 B2 | 12/2020 | Eisen | |
| 10,868,815 B2 | 12/2020 | Love et al. | |
| 2015/0237049 A1* | 8/2015 | Grajek | H04L 67/02 726/7 |
| 2018/0123804 A1* | 5/2018 | Smith | H04L 9/0861 |

\* cited by examiner

*Primary Examiner* — Nelson S. Giddins
(74) *Attorney, Agent, or Firm* — SHOOK, HARDY & BACON L.L.P.

(57) ABSTRACT

Embodiments of the present disclosure are directed to systems and methods for remote deauthentication of electronic devices. A virtual authentication session manager or an electronic device maintains authentication across multiple electronic devices. The virtual authentication session manager receives authentication requests from electronic devices and generates a unique ID and a readable name for each device. A user can remotely deauthenticate any of the electronic devices that have previously been authenticated.

17 Claims, 4 Drawing Sheets

REMOTE USER DEVICE DEAUTHENTICATION

SUMMARY

The present disclosure is directed to systems and methods for remote deauthentication of user devices, substantially as shown and/or described in connection with at least one of the Figures, and as set forth more completely in the claims.

According to various aspects of the technology, one or more user devices may be remotely deauthenticated in order to control access to a particular account. As the number of devices associated with a single user increase and as people share account access with friends and family, it often becomes problematic to determine what devices have access to a particular account, let alone how to manage those devices. Conventionally, once a user device is authenticated with an account, that user device will have access to the account until the authentication token (or stored authentication information) is altered, which has historically required access (whether physical or electronic) to the user device. Alternatively, account access information such as a username or password may be changed, forcing all user devices to re-authenticate. By assigning a unique and user-discernable identifier to each user device when it becomes authenticated and associated with an account and permitting an authenticated user device to deauthenticate specific user devices, the process of managing account access becomes more efficient and account security increases.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018). As used herein, the generic term "account" is used to refer to any access-restricted resource (e.g., an electronic bank account, a media streaming account such as on Netflix or Hulu, a utility account, and the like). The term "subscriber account" is used herein to represent the specific account that a particular user has with a "network operator" (i.e., an entity (e.g., a corporation) that provides networked connectivity to one or more UEs; examples of operators include wireless telecommunication carriers such as T-Mobile, AT&T, Verizon, and the like). The term "deauthenticate" is used in its logical form, referring to the revocation or loss of authenticated status; for example, if a first user device successfully went through an authentication process in order to gain access to an account (e.g., logging in using a password and/or token), the first user device would be considered authenticated—if deauthenticated, the first user device would no longer be permitted to the account or one or more of the account resources. The term "base station" is used in its generic and literal sense and refers to any radio station that transmits and/or receives signals to/from one or more destinations (e.g., UEs); the base station may be terrestrial (e.g., a macro cell, small cell, and femto cell) or extraterrestrial (e.g., a satellite, aircraft, or tethered inflatable).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media. Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, there are many different types of user devices which may be given access by a user to particular account. Whether via an executable application (e.g., an application on a phone) or a web browser, user devices may access the particular account by logging in the account. Once the correct login information is used (e.g., username, password, two factor authentication token, etc.), the user device accessing the account may be generally considered authenticated. Many accounts permit an authenticated device to remain authenticated for a lengthy period of time or until the access information (e.g., access token refresh or access token certification) is altered. Because many modern users have multiple devices or share account access with friends, roommates, or family members, the number and identity of user devices given access to the particular account creates a security vulnerability. If a device is lost or stolen, an undesirable possessor of the wayward device may be able to access the account; if a relationship ends, an ex may be able to gain access to a bank account; if an authenticated user begins acting undesirably or maliciously, they may be able to compromise the account. Countless other possibilities exist where identifying and deauthenticating a particular user device would be desirable without being required to change login information, which may have the effect of revoking access to all previously authenticated users.

In order to solve this problem, the present disclosure is directed to systems, methods, and computer readable media for remote deauthentication of user devices. The inventive solution includes creating device identifiers that are user-discernable during user device authentication that permit the management of individual user devices at a later time. For example, when a new user device becomes authenticated with a particular account for the first time, it may be automatically assigned a unique user-discernable identifier (e.g., Patrick's iPhone 12) or permit a user to create a unique user-discernable identifier (e.g., Living Room TV). When it becomes desirable for account access to be managed, an authenticated user device may deauthenticate one or more other authenticated devices, revoking access to the account for the deauthenticated device. The deauthentication may be done remotely, without the need to have physical or other access to the user device to be deauthenticated.

Accordingly, a first aspect of the present disclosure is directed to a system for multiple access in a wireless network environment comprising a base station and one or more computer processing components configured to perform a method comprising validating an authentication of a first user device to access an account based at least in part on a device identifier used by the first user device to wirelessly communicate with the base station. The method further comprises generating a list of authenticated devices, each of the authenticated devices having access to the account, wherein the list of authenticated devices comprises a second user device. The method further comprises communicating the list of authenticated devices to the first user device. The method further comprises receiving an instruction from the first user device to deauthenticate the second user device. The method further comprises revoking the authentication status of the second user device to access the account.

A second aspect of the present disclosure is directed to a method for remote deauthentication of user devices comprising receiving a request from a target device to access an account. The method further comprises based on the request being authenticated, assigning a user-discernable identifier to the target device. The method further comprises receiving a request from a first user device to perform a deauthentication procedure for an account. The method further comprises validating an authentication of the first user device to access the account based at least in part on a device identifier used by the first user device to wirelessly communicate with the base station, wherein the device identifier indicates that the first user device is associated with an administrator role for the account. The method further comprises generating a list of authenticated devices, each of the authenticated devices having access to the account, wherein the list of authenticated devices comprises the target device and wherein the list of authenticated devices comprises the user-discernable identifier of the target device. The method further comprises communicating the list of authenticated devices to the first user device. The method further comprises receiving an instruction from the first user device to deauthenticate the target device; and revoking the authentication status of the target device to access the account.

According to another aspect of the technology described herein, one or more non-transitory computer readable media containing instructions thereon that, when executed, cause one or more computer processing components to perform a method comprising receiving a request from a first user device to perform a deauthentication procedure for an account. The method further comprises validating an authentication of the first user device to access the account based at least in part on a device identifier used by the first user device to wirelessly communicate with a base station. The method further comprises generating a list of authenticated devices, each of the authenticated devices having access to the account, wherein the list of authenticated devices comprises a target device. The method further comprises communicating the list of authenticated devices to the first user device. The method further comprises receiving an instruction from the first user device to deauthenticate the target device. The method further comprises revoking the authentication status of the target device to access the account, wherein the target device is denied access to the account until the first user device reauthenticates the target device or the target device uses username/password/multi-factors to authenticate.

Figure 1:
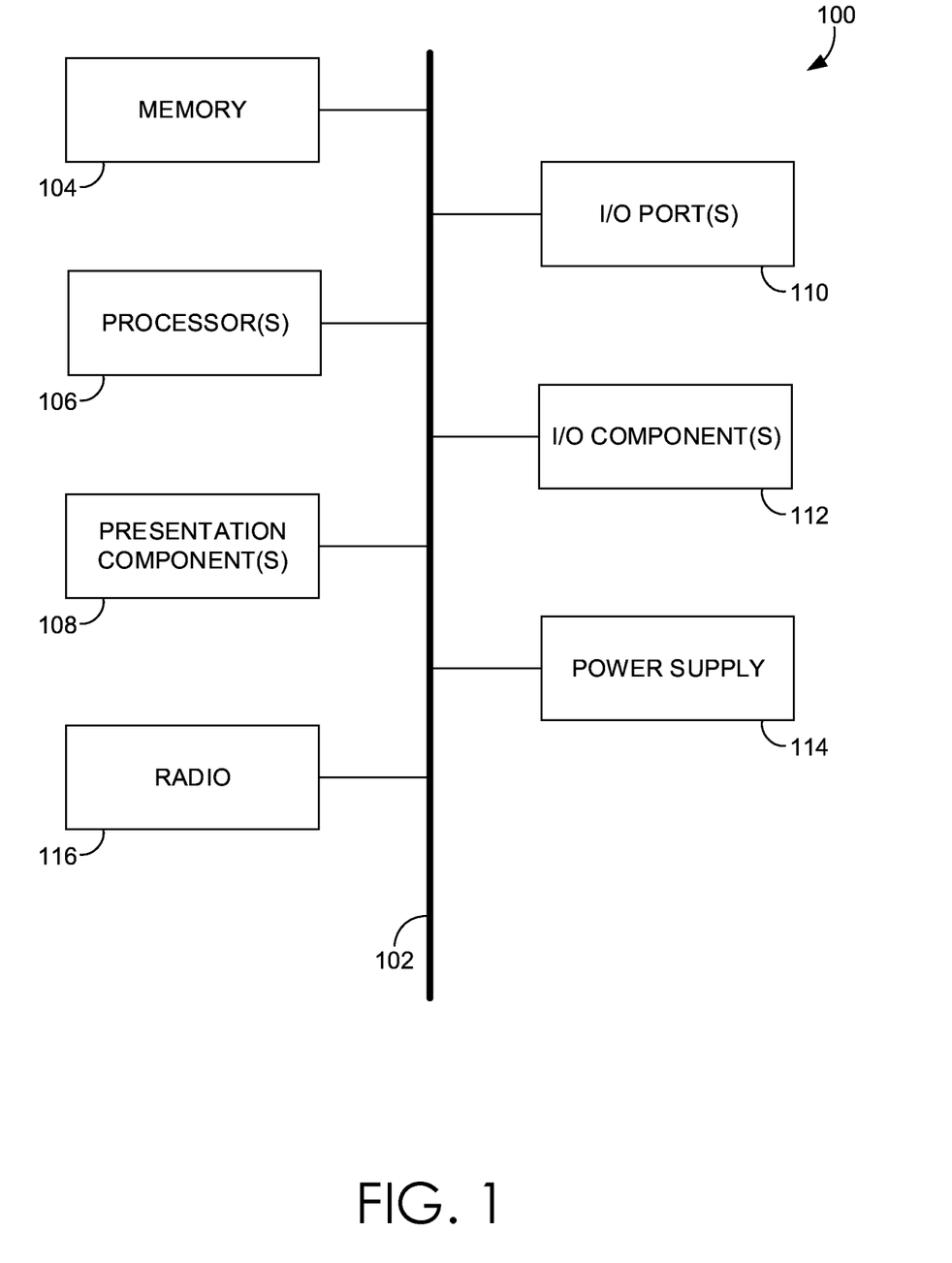
FIG. 1 illustrates an exemplary computing device for use with the present disclosure.

Referring to FIG. 1, a diagram is depicted of an exemplary computing environment suitable for use with implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include equipment types identified by the GSMA, including mobile/feature phones, smart phones, tablets, IoT devices, wearable devices, dongles, modems, and WLAN routers, each of which may have any one or more components depicted in FIG. 1.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
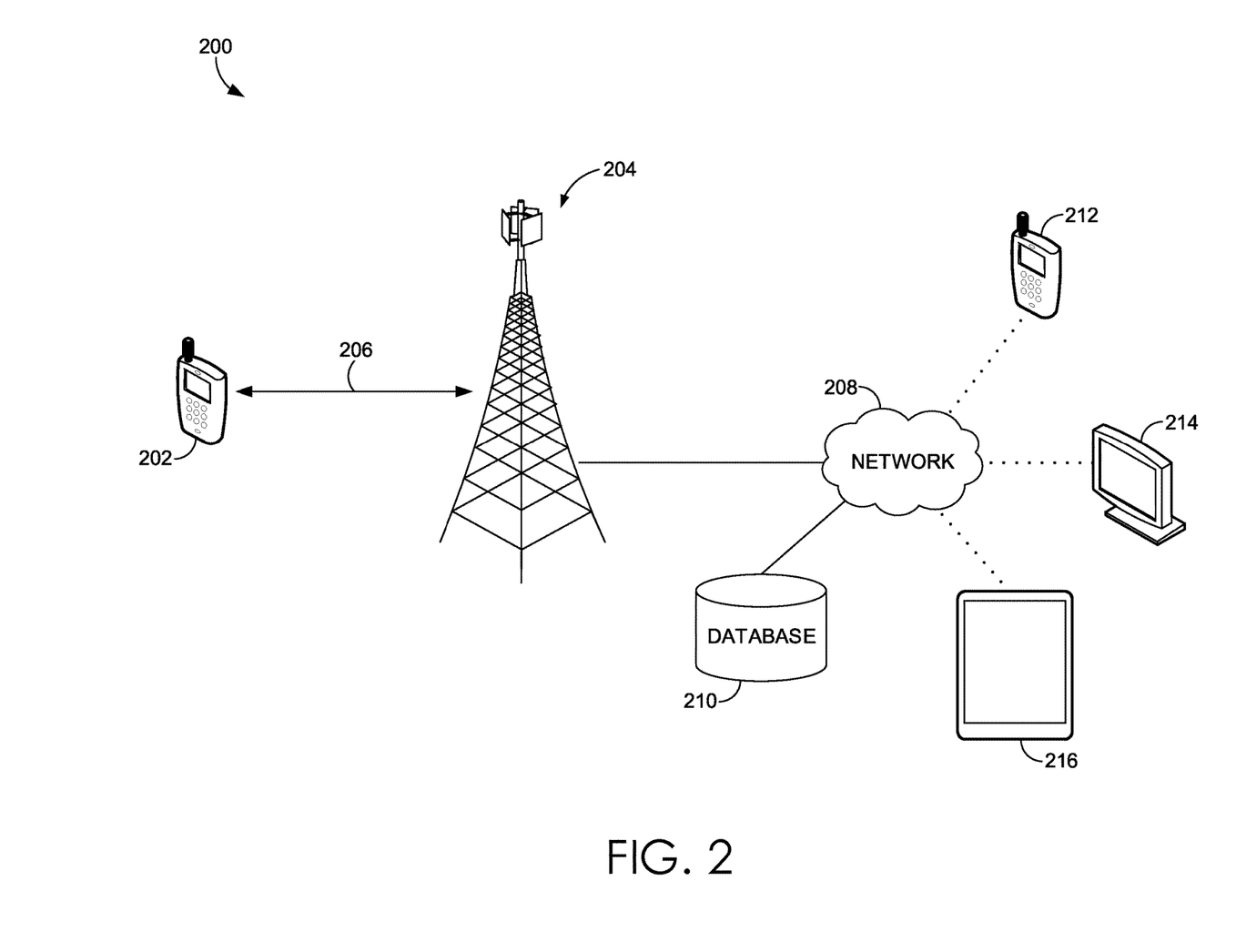
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. At a high level, the network environment 200 may be said to comprise a first UE 202, a base station 204 that wirelessly connects the first UE 202 to a network 208, and a plurality of user devices that are also connected to the network 208. The first UE 202 may be any electronic device that has a wireless connection 206 with the base station 204; for example, the first UE 202 may be a cell phone, cellular enabled tablet, fixed wireless access modem, or any device described with respect to the computing device 100 of FIG. 1. Though illustrated as a terrestrial macro site, the base station 204 may take any desirable form, including a small cell, femto cell, or the like, and may be extra-terrestrial (e.g., a satellite or airborne station), and may utilize any desirable radio access technology, including an eNodeB, gNodeB, or any other equipment that is generally configured to process, transmit, and receive wireless signals. The network 208 may be a data network, core telecommunication network (e.g., EPS core or 5G core), PTSN, or any other destination remote to the base station 204 that is sought by the first UE 202.

In addition to the first user device, the network environment 200 comprises a plurality of user devices, including a second user device 212, a third user device 214, and a fourth user device 216. Each of the second user device 212, the third user device 214, and the fourth user device 216 may be any type of electronic device (e.g., a phone, a television, a tablet, and the like) capable of communicating with the network 208; shown as dotted lines, the type of connection between each of the second user device 212, the third user device 214, and the fourth user device 216 and the network 208 is not relevant for the purposes of this disclosure. It is sufficient that each of the second user device 212, the third user device 214, and the fourth user device 216 has a connection (e.g., wired Ethernet, wireless cellular, wireless 802.11) with the network 208 using any number of relays, switches, or other equipment. For the purposes of this disclosure, it is only relevant that each of the second user device 212, the third user device 214, and the fourth user device 216 is connected to the network 208 at the time that each of the second user device 212, the third user device 214, and the fourth user device 216 become authenticated and when they request access to an account or account resources. The network environment 200 may further comprise a database 210 that is communicatively coupled to the network 208; in aspects, the database 210 may be a part of the network 208 or it may be separate from the network 208.

Each user device in the network environment 200 may be used to access an account. In order for any particular user device to access an account, it must first become authenticated. A user device may be authenticated using login information alone or in combination with a token. Once the user device is authenticated, it may access the account and/or one or more account resources associated with the account. User device authentication may be one time or persistent; a one-time authentication may be said to only require the particular user device to authenticate once (allowing subsequent access attempts to be successful without additional logins/2FA, etc.) on the basis that a fetched token has a long valid period or is able to update without user interaction, and a persistent login may be said to require the user device to login and/or use a token each time that the user device attempts to access the account on the basis that a fetched token has a short life (e.g., 30 minute or less). Regardless, if the user device has the proper login credentials, token, and/or permissions, it will become authenticated when it attempts to access the account. In aspects of the present disclosure, a particular user device will be assigned a unique user-discernable identifier subsequent to its first authentication with the account. The user-discernable identifier may be automatically assigned based on information known about the device used to access the account, generated based on the responses from a user associated with the user device when prompted to enter information about the device, or a combination of the two. For example, when the second user device 212 first successfully becomes authenticated to access an account, the second user device may be assigned an identifier including the device make and model (e.g., iPhone 12 or Samsung Note 20). In another example, when the third user device 214 first successfully becomes authenticated to access the account, the third user device 214 may be prompted to enter identifying information such as the user's name associated with the third user device 214, the device type/descriptor, and a device location (e.g., Patrick's Living Room TV). The user-discernable device identifier may include time-location information of the user device; the time-location information may be based on the time and location of first authentication, the time and location of last access, or any other desirable time-location-based information. Time-location information may be particularly useful for lost/stolen devices. For example, if the fourth user device 216 was automatically assigned a device identifier of Heather's iPad but no time-location information was available, an account administrator may not know if the fourth user device 216 is actively being used to access the account even though it has been misplaced, lost, or stolen. With the time-location information, the account administrator may determine that the most recent account access occurred at a time and location that was indicative of an unauthorized user having possession of the fourth user device 216 and using the fourth user device 216 to access the account.

Utilizing the user-discernable identifiers, any one or more of the second user device 212, the third user device 214, and the fourth user device 216 may be deauthenticated. In a first aspect, any authenticated user device may perform deauthentication once the user device is, itself, authenticated; in a second aspect, only a user device having authenticated as an administrator may perform deauthentication. For the purposes of performing a deauthentication procedure, the user device that is used to perform the procedure may be referred to as the deauthenticating user device (c.f., the deauthenticat-ed user device, which is having its access revoked). In one aspect, any of the first user device 202, the second user device 212, or the third user device 214, based on having already been authenticated with the account, may be the deauthenticating device in order to deauthenticate the fourth user device 216. In another aspect, the first user device 202 may be the deauthenticating device based at least in part on an association between a wireless device identifier (e.g., SIM information, the IMEI, MAC address, or the like) that is communicated with the base station 204 and a user. For example, the network operator may know that the first user device 202 is registered with a first user's subscriber account and that the first user is also authenticated to access the account. The wireless device identifier, communicated between the first user device 202 and the base station 204 as a normal part of the connection 206, may function as a two factor authentication, permitting the first user device 202 to perform enhanced account security operation such as deauthentication.

Figure 3:
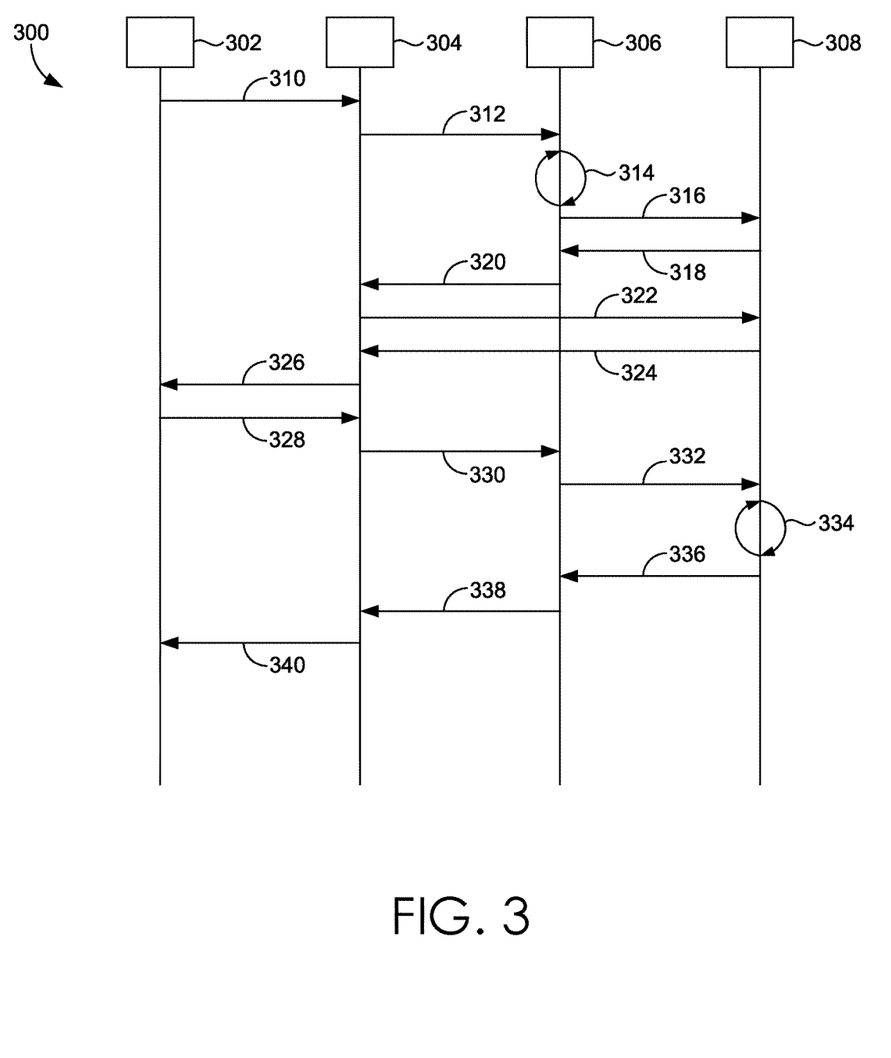
FIG. 3 illustrates a flow diagram of one embodiment of a method for remote user device deauthentication for use with the present disclosure.

Turning now to FIG. 3, a deauthentication procedure that is suitable for being performed in accordance with any one or more aspects of the present disclosure is illustrated as a method 300. The method 300 comprises a client 302, which may take the form of a user device such as the first user device 202 of FIG. 2 or an application, process, or executable running thereon, a first server 304, which may be associated with a network operator and is generally configured to route and handle communications between the client 302 and other networked devices, an authentication server 306 that is configured to manage account authentication and deauthentication, and a database 308 that is configured to store information relating to account authentication. At a first step 310, the client 302 requests an authenticated device list. At a second step 312, the first server 304 communicates with the authentication server 306 with a query to determine if the client 302 is authenticated, itself. At a third step 314, the authentication server 306 checks token validation and expiration associated with the client 302. Having determined at the third step that the client 302 is authenticated, at a fourth step 316, the authentication server queries the database 308 to determine if the client 302 has been deauthenticated. At a fifth step 318, the database 318 returns a validation result indicating that the client 302 has not been deauthenticated. Having determined that the client is authenticated to access the account and has not been deauthenticated, the authentication server returns a validation result to the first server at a sixth step 320. At a seventh step 322, the first server requests the authenticated device list from the database 308. At an eighth step 324, the database 308 responds with a list of all devices that have been authenticated to access the account along with a unique user-discernable device identifier associated with each user device. At a ninth step 326, the list of authenticated devices and their device identifiers is communicated to the client 302. At a tenth step 328, the client 302 communicates an instruction to deauthenticate a target device, wherein the target device was listed in the list of authenticated user devices. At an eleventh step 330, the first server 304 communicates the instruction to deauthenticate the target device to the authentication server 306, which communicates the instruction to the database 308 at a twelfth step 332. At thirteenth step 334, the database 308 creates or modifies an entry associated with the target device to indicate that it has been deauthenticated. The database 308 communicates to the authentication server 306 at a fourteenth step 336 that the modification has been made, the authentication server 306 communicates the success to the first server at a fifteenth step 338, and the first server 304 communicates the successful deauthentication to the client 302 at the final step 340.

With reference to FIG. 2, if the method 300 was performed by the first user device 202 and the method was performed to deauthenticate the fourth user device 216, the fourth user device 216 would no longer be able to access the account. In a first aspect, upon deauthentication, the fourth user device 216 may be permanently prohibited from accessing the account upon the determination of a unique device identifier of the fourth user device 216, unless the fourth user device 216's deauthentication was revoked (by any other authenticated user, the authenticated user the revoked the fourth user device 216, or an account administrator, depending on the desirable level of security associated with account management). In a second aspect, upon deauthentication, the fourth user device 216 may be prohibited from accessing the account until it reauthenticated using authentication credentials. In any aspect, the method 300 may be performed by a user device (e.g., the first use device 202) at will (the user device may initiation the method 300 at any time for any reason). The method 300 may be performed semi-automatically by prompting the user device to perform the method 300 upon detection of potentially malicious of suspect behavior of an authenticated user device (e.g., if the fourth user device 216 attempts to access the account from a location that is beyond a threshold distance from its last access location, if a threshold high number of user devices attempt to authenticate with the same credentials within a predetermined period of time (e.g., 10+ devices attempt to login within a 10 minute period), or if an authenticated user device accesses a particularly sensitive account resource (e.g., if the account is a bank account, the particularly sensitive account resource may be an electronic funds transfer tool) in an unusual way (e.g., first time accessing the particularly sensitive account resource, greater than threshold number of times accessing the particularly sensitive account resource within a predetermined period of time)). The method 300 may be also be performed automatically and notify the user device afterwards for verification or to undo the deauthentication. second user device 212, the third user device 214, and the fourth user device 216.

Figure 4:
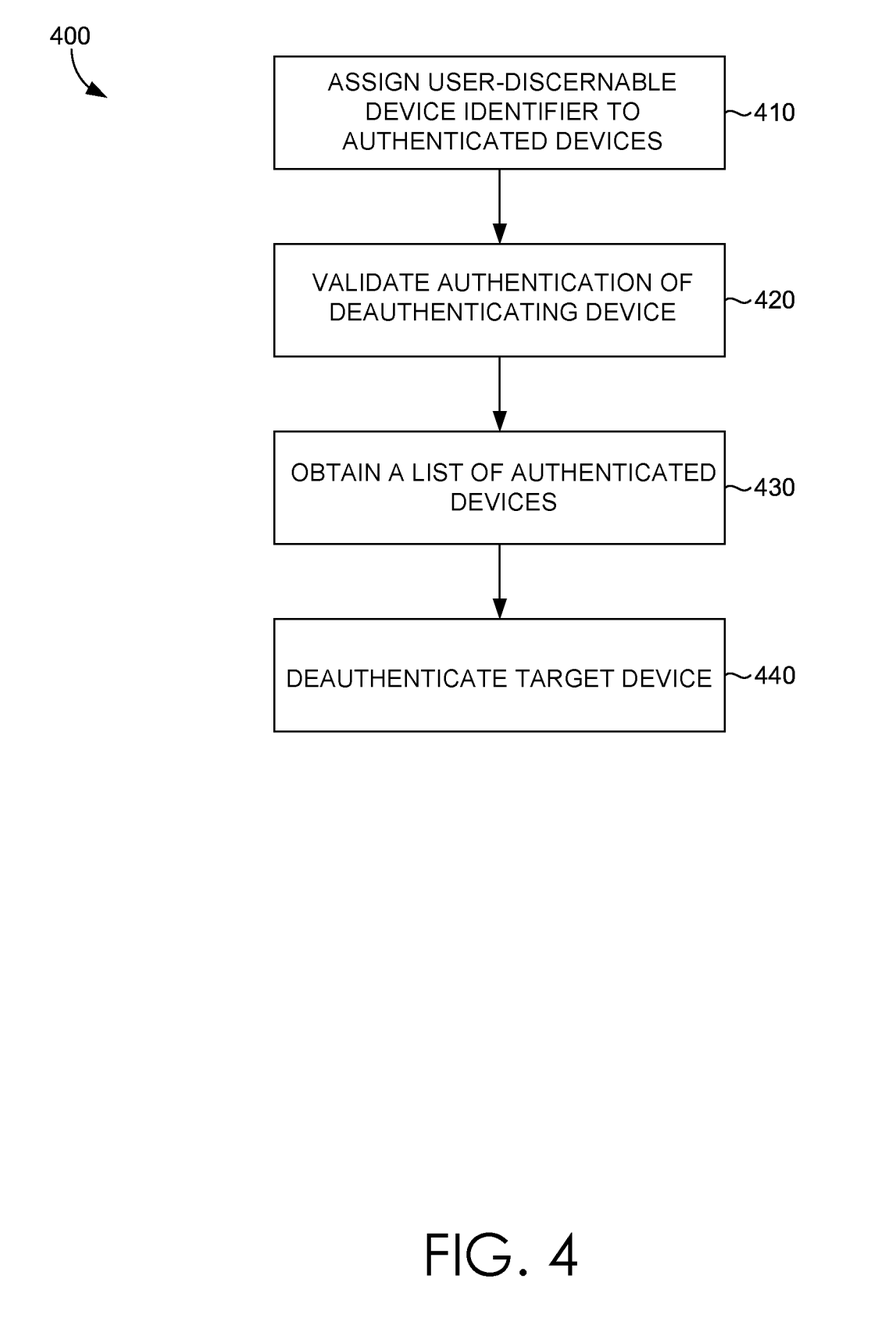
FIG. 4 depicts a flow diagram of an exemplary method for remote user device deauthentication, in accordance with embodiments described herein.

Turning now to FIG. 4, a flow chart is provided that illustrates one or more aspects of the present disclosure relating to a method 400 for remotely deauthenticating a user device. At a first step 410, a unique user-discernable device identifier is assigned to each user device that becomes authenticated to access an account, according to any one or more aspects of FIGS. 2-3 (e.g., said assignment occurring at the first authentication or said assignment being updated each time the device authenticates to access the account). At a second step 420, a first user device initiates a deauthentication procedure having the authentication of the first user device to access the account, validated in accordance with any one or more aspects disclosed herein (e.g., based on the first user device just having the correct authentication credentials, based on a wireless device identifier associated with the first user device and the account being communicated to base station, or based on the first user device authenticating as an administrator role). At a third step 430, the first user device obtains a list of authenticated devices that have been authenticated to access the account, in accordance with one or more aspects described herein. At a fourth step 440, the first user device deauthenticates a target device in accordance with any one or more aspects disclosed herein.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for remote user device deauthentication comprising:
   a base station; and
   one or more computer processing components configured to perform operations comprising:
   determining that a second user device has accessed an account from a second location at a second time, the second location being greater than a threshold distance from a first location at which the second use device accessed the account at a first time, the second time being subsequent to the first time, the second device being authenticated to access the account at the first time;
   based on said determination, prompting a first user device to perform a security review, the security review comprising:
      validating an authentication of the first user device to access an account based at least in part on a device identifier used by the first user device to wirelessly communicate with the base station;
      generating a list of authenticated devices, each of the authenticated devices having access to the account, wherein the list of authenticated devices comprises the second user device;
      communicating the list of authenticated devices to the first user device;
      receiving an instruction from the first user device to deauthenticate the second user device; and
      revoking the authentication status of the second user device to access the account.

2. The system of claim 1, wherein revoking the authentication of the second user device prevents the second user device from subsequently accessing the account until the second user device is re-authenticated by the first user device.

3. The system of claim 1, wherein revoking the authentication of the second user device prevents the second user device from subsequently accessing the account until the second user device re-authenticates.

4. The system of claim 3, wherein the second user device re-authenticates using a second authentication process, the second authentication process being different a first authentication process that was used by the second user device to access the account prior to the revocation of authentication status.

5. The system of claim 1, wherein each device of the list of authenticated devices comprises a unique user-discernible identifier.

6. The system of claim 5, wherein the unique user-discernable identifier is at least partially based on an input by an authorized user that indicates a device characteristic.

7. The system of claim 5, wherein the unique user-discernable identifier comprises time-location for each device of the list of authenticated devices.

8. The system of claim 7, wherein the time-location information comprise an indication of the time and location that each device was first authenticated to access the account.

9. The system of claim 7, wherein the time-location information comprises an indication of the most recent time and location that each device was authenticated to access the account.

10. The system of claim 1, wherein the first user device is remote from the second user device.

11. The system of claim 1, wherein the device identifier used by the first user device to wirelessly communicate with the base station comprises an IMEI number.

12. The system of claim 1, wherein the device identifier used by the first user device to wirelessly communicate with the base station comprises a MAC address.

13. A method for remote deauthentication of user devices comprising:
   determining that a target device has accessed a sensitive resource of an account at a first time, the target device being authenticated to access the account at the first time;
   based on said determination, prompting a first user device to perform a security review, the security review comprising:
      receiving a request from the first user device to perform a deauthentication procedure for an account;
      validating an authentication of the first user device to access the account based at least in part on a device identifier used by the first user device to wirelessly communicate with the base station, wherein the device identifier indicates that the first user device is associated with an administrator role for the account;
      generating a list of authenticated devices, each of the authenticated devices having access to the account, wherein the list of authenticated devices comprises the target device;
      communicating the list of authenticated devices to the first user device;
      receiving an instruction from the first user device to deauthenticate the target device; and
      revoking the authentication status of the target device to access the account.

14. The method of claim 13, wherein revoking the authentication of the target device prevents the target device from subsequently accessing the account until the target device is re-authenticated by the first user device.

15. The method of claim 13, wherein the unique user-discernable identifier is at least partially based on an input by an authorized user that indicates a device characteristic.

16. The method of claim 13, wherein the unique user-discernable identifier comprises an indication of the most recent time and location that the target device was authenticated to access the account.

17. One or more non-transitory computer readable media containing instructions thereon that, when executed, cause one or more computer processing components to perform operations comprising:
   determining that a threshold high number of user devices have accessed an account within a time period using a first set of access credentials, the first set of access credentials being authorized to access the account during the time period;
   based on said determination, prompting a first user device to perform a security review, the security review comprising:
      receiving a request from a first user device to perform an account management procedure for an account;
      validating an authentication of the first user device to access the account based at least in part on a device identifier used by the first user device to wirelessly communicate with a base station;
      generating a list of authenticated devices, each of the authenticated devices having access to the account, wherein the list of authenticated devices comprises a target device;

communicating the list of authenticated devices to the first user device;
receiving an instruction from the first user device to deauthenticate the first set of access credentials; and
revoking the authentication of the first set of access credentials to access the account.

\* \* \* \* \*